United States Patent Office 3,172,865
Patented Mar. 9, 1965

3,172,865
PROCESS FOR PRODUCING A CO-CRYSTALLIZED SALT CONSISTING ESSENTIALLY OF ALUMINUM CHLORIDE AND TITANIUM TRICHLORIDE
John R. Fennell, El Cerrito, Calif., assignor to Stauffer Chemical Company, a corporation of Delaware
No Drawing. Filed Jan. 12, 1959, Ser. No. 786,047
2 Claims. (Cl. 252—442)

This invention relates to the making of a polymerization catalyst suitable for the polymerization of propylene to polypropylene. More particularly, the invention relates to a novel method of making a co-crystallized salt containing the chlorides of titanium and aluminum.

It has previously been proposed to make co-crystallized catalysts containing aluminum and titanium chlorides, but the processes heretofore proposed have ordinarily required relatively high temperatures, high pressures and long reaction times. For instance, it has been proposed to make a catalyst utilizing a reaction within a bomb at pressures on the order of ten atmospheres and at temperatures approaching 400° C., requiring a reaction time of about 24 hours. By contrast, the reaction of the present invention can be conducted in ordinary glass laboratory equipment or conventional metal reactors at atmospheric pressure and at a temperature not over the boiling point of titanium tetrachloride (136° C.). Further, the reaction of the present invention requires only a few hours. In addition to being much simpler to produce, the product of the present invention is much more reactive as a polymerization catalyst than catalysts heretofore produced.

In the manufacture of catalysts for propylene polymerization, it is quite common to grind the catalyst in a wet slurry using an inert liquid such as a hydrocarbon. This wet grinding has been conducted for extended periods of time. One surprising feature of the present invention is that the catalyst is activated to a much higher degree than catalysts heretofore known, by dry grinding of the catalyst. Dry grinding has one added advantage in that the product does not have to be separated from the liquid grinding medium.

In accordance with the present invention, flake aluminum, a small portion of the total titanium tetrachloride used, and the aluminum chloride are first mixed and heated at the boiling point of titanium tetrachloride in a vessel equipped with a reflux column. After the reaction has started additional increments of titanium tetrachloride are made at a rate just sufficient to maintain a gentle reflux. The reaction once begun is very exothermic and by adding the $TiCl_4$ in this manner it has the dual function of supplying a reactant as well as a quenching action. A two to four fold (or greater) stoichiometric excess of titanium tetrachloride is used in the reaction but the exact amount is not critical; it will suffice to say that enough $TiCl_4$ is used to react with all of the aluminum, to keep the reaction under a gentle boil (this is no problem once the bulk of the aluminum has reacted) and to provide a diluent for the reacting bed of material. The co-crystallized titanium trichloride-aluminum chloride complex is then separated from the residual titanium tetrachloride and subjected to dry ball milling in a dry, oxygen-free atmosphere to produce the final activated catalyst.

One surprising discovery in connection with the present invention is that flake aluminum must be used. Granular or atomized aluminum does not work in accordance with the present invention. The reasons for this are due to the differences in the surface chemistry of the two forms of aluminum. Granular aluminum is usually produced by atomizing molten aluminum in a blast of air. In this manner, sausage-shaped granules are formed; these particles have length, width and thickness all of the same magnitude. Flake aluminum is formed by stamping or milling thin aluminum foil in the presence of a lubricant (stearic acid is commonly used). The resulting flakes have width and length dimensions many times their thickness. A typical flake aluminum has a thickness of $5 \times 10^{-6}$ inch. The reactivity of the flake aluminum in the process in question is attributed to the thinness of the aluminum flake. A much greater surface free energy is present, a much greater surface is in contact with the titanium tetrachloride and the heat of reaction produced on the surface of the aluminum flake is sufficient to heat through these thin particles, thereby increasing the rate of reaction. In the case of granular aluminum, we do not have this great surface and the heat of reaction is carried away by the denser particles as soon as it is produced.

Another feature of the present invention is that if the full amounts of the reactants are added initially the reaction will not commence. Therefore, the initial ratio of titanium tetrachloride to aluminum chloride must be kept very low. It has been determined that the initial ratio of titanium tetrachloride to aluminum trichloride should be kept below 285:1 (on a weight basis) and preferably be kept below 85:1. The initial titanium tetrachloride to aluminum ratio is also quite critical and should be kept below 175:1 and preferably below 25:1.

The mechanism of the action of the aluminum chloride on the surface of the aluminum flake is not understood, but one possibility is that the aluminum and aluminum trichloride first react to form a sub-chloride and another is that there may be an initial etching of the aluminum surface by the aluminum chloride; either would provide sufficient energy in the concentrated suspension for the reaction to begin and remain self-sustaining. After the reaction has been initiated, further titanium tetrachloride can be added sufficient to complete the reaction.

Providing the initial concentrations of the reactants are kept within the preferred limits cited above, the reaction begins almost immediately upon reaching the normal boiling temperature of titanium tetrachloride. This can be seen from Examples 1 and 4. If the initial reactant concentrations are outside the preferred limits but still within the minimum limits, an induction period of from several minutes to hours will occur (see Example 3). In cases where the reactant concentrations are completely outside the limits specified, no reaction will occur (see Example 2).

Only a small amount of aluminum chloride is added to initiate the reaction. This quantity usually amounts to about 1% (by weight) of the total product produced although larger amounts can of course be used. Aluminum chloride is of course formed in the reaction and the resulting co-crystal has the composition corresponding to $(3TiCl_3) \cdot AlCl_3$. This corresponds to approximately 78% $TiCl_3$ and 22% $AlCl_3$ (by weight).

The following non-limiting examples illustrate preferred methods of carrying out the invention:

*Example 1.*—A reaction vessel containing a mixture of 1 mole (27 g.) flake aluminum (granular or atomized aluminum will not work), 0.04 mole (5 g.) anhydrous aluminum chloride and 1.8 mole (340 g.) titanium tetrachloride was heated in an inert atmosphere with stirring, to the boiling point of the $TiCl_4$ (136° C.). The refluxing bed began to turn violet (within 5 minutes), indicating the formation of the $TiCl_3$. Now an additional 8.1 mole (1,540 g.) of $TiCl_4$ was added at a rate sufficient to control the reflux, i.e., it acts as a reactant and as a quench to dissipate the heat of reaction. The stirred violet mass was heated for a total of 3 hours. At the end of this time, the excess $TiCl_4$ was removed from the violet solid by distillation, either at reduced or atmospheric pressure and the co-crystallized $(3TiCl_3) \cdot AlCl_3$ recovered in almost quantitative yield. This powder was subjected to intense grinding in a ball mill for 25 hours under dry oxygen-free conditions. The finely divided solid was then added to a suitable solvent such as n-heptane, an aluminum alkyl such as aluminum triethyl added and propylene admitted under slight super-atmospheric conditions. In this manner, good yield of polypropylene were obtained.

*Example 2.*—To a reaction vessel similar to the one cited in Example 1 was added 0.1 mole (2.7 g.) flake aluminum, 0.004 mole (0.5 g.) anhydrous $AlCl_3$ and 0.9 mole (171 g.) $TiCl_4$. This mix was heated under refluxing $TiCl_4$ for 8 hours. No reaction took place during this time.

*Example 3.*—0.10 mole (2.7 g.) aluminum, 0.005 mole (0.75 g.) $AlCl_3$ and 0.45 mole (35 g.) $TiCl_4$ was heated as above. After 30 minutes, no reaction had occurred. At this point, the reaction began and an additional 0.45 mole (85 g.) of $TiCl_4$ was added as in Example 1. The mass was heated for an additional hour and the excess $TiCl_4$ removed as stated in Example 1. The violet powdered $(3TiCl_3) \cdot AlCl_3$ was obtained. This material was ground dry and utilized, as in Example 1.

*Example 4.*—As in Example 1, 0.2 mole flake aluminum (5.4 g.), 0.11 mole (14 g.) $AlCl_3$ and 0.3 mole (57 g.) $TiCl_4$ were heated to reflux. Within 5 minutes, the reaction began to turn violet; an additional 0.9 mole $TiCl_4$ was added as in Example 1. The mass was heated for 2 hours and excess $TiCl_4$ removed in the usual manner. A good yield (ca. 85%) of $(3TiCl_3) \cdot AlCl_3$ was obtained. This material was ground dry and utilized, as in Example 1.

After the $(3TiCl_3) \cdot AlCl_3$ salt has been ground for the specified time, it can be activated by an organo-aluminum compound. Trialkyl aluminum compounds are usually used although the aluminum dialkyl and monoalkyl halides can also be used. The molar ratio of the aluminum trialkyl to the titanium trichloride should be above 2:1, that is enough trialkyl aluminum must be added so that it can convert all of the aluminum chloride to the aluminum dialkyl chloride and leave an additional amount to activate the titanium trichloride catalyst.

The following example illustrates the activation of the catalyst as well as its use for the polymerization of propylene:

*Example 5.*—0.0715 g. of the $(3TiCl_3) \cdot AlCl_3$ and 0.109 g. of aluminum triethyl (molar ratio of $AlEt_3/TiCl_3$ is 2.6) were added to a reactor containing 300 ml. of dry n-heptane. The reactor was agitated by means of constant shaking. Gaseous propylene was admitted under 30 pounds per square inch gauge pressure. The temperature was controlled at $55 \pm 5°$ C. and the polymerization allowed to proceed for 3½ hours. At the end of this time the polymer was washed and dried. The total yield of solid polymer amounted to 23.3 g. This corresponds to a conversion of 415 g. polymer per g. titanium trichloride in this period.

I claim:

1. A process for making a co-crystallized salt consisting essentially of aluminum trichloride and titanium trichloride and being free of elemental aluminum; said titanium trichloride being associated with the aluminum trichloride in the molar ratio of three moles titanium trichloride and one mole aluminum trichloride, from an initial solvent-free mixture of flake aluminum, titanium tetrachloride and aluminum trichloride, wherein the ratio by weight of the titanium tetrachloride to the aluminum trichloride is not greater than 285:1 and the ratio of titanium tetrachloride to aluminum is not greater than 175:1, heating the mixture to 136° C. and continuing to heat thereafter under reflux conditions at atmospheric pressure until titanium trichloride starts to form adding additional titanium tetrachloride and continuing heating said refluxing mixture until formation of the co-crystallized salt is complete.

2. The process of claim 1, wherein the ratio by weight of titanium tetrachloride to aluminum trichloride is below 85:1 and the ratio of titanium tetrachloride to aluminum is below 25:1.

References Cited in the file of this patent

UNITED STATES PATENTS

| | | |
|---|---|---|
| 2,928,818 | Carter et al. | Mar. 15, 1960 |
| 3,032,510 | Tornqvist et al. | May 1, 1962 |

FOREIGN PATENTS

| | | |
|---|---|---|
| 874,215 | Germany | Apr. 23, 1953 |